United States Patent

Kloss et al.

[11] Patent Number: 5,340,778
[45] Date of Patent: Aug. 23, 1994

[54] OPTICAL CROWN GLASS HAVING NEGATIVE ANOMALOUS PARTIAL DISPERSION AND HIGH UV TRANSMISSION

[75] Inventors: Thomas Kloss; Elfi Stein; Kirsten Gerth; Andrea Wickardt, all of Jena, Fed. Rep. of Germany

[73] Assignee: Scott Glaswerke, Mainz, Fed. Rep. of Germany

[21] Appl. No.: 71,636

[22] Filed: Jun. 4, 1993

[30] Foreign Application Priority Data

Jun. 4, 1992 [DE] Fed. Rep. of Germany ....... 4218377

[51] Int. Cl.$^5$ .................... C03C 3/064; C03C 3/145; C03C 4/08
[52] U.S. Cl. ........................... 501/52; 501/77; 501/901; 501/903; 501/905
[58] Field of Search .................. 501/50, 51, 52, 77, 501/78, 79, 901, 903, 905

[56] References Cited

U.S. PATENT DOCUMENTS

| | | | |
|---|---|---|---|
| 3,510,325 | 8/1965 | Broemer et al. | 501/51 |
| 3,912,525 | 10/1975 | Monneraye et al. | 501/79 |
| 4,043,852 | 8/1977 | Izumitani et al. | 501/903 |
| 4,642,297 | 2/1987 | Mennemann et al. | 501/903 |

FOREIGN PATENT DOCUMENTS 1444450 7/1976 United Kingdom .

*Primary Examiner*—Karl Group
*Assistant Examiner*—Deborah Jones
*Attorney, Agent, or Firm*—Millen, White, Zelano & Branigan

[57] ABSTRACT

An optical crown glass having a negative anomalous partial dispersion $\Delta P_{g,F}$, a refractive index $n_d$ of greater than 1.52, an Abbe number $\nu_d$ of greater than 57, and a high UV transmission has a composition (in % by weight) 40–72 $B_2O_3$, 9–31 $Al_2O_3$, 0–15 $SiO_2$, 0.1–0.5 $H_2O$, 0–12 $Li_2O$, wherein the total of $R_2O$ (R=Li, Na, K, Rb, Cs) is 0–20 and the total of MO (M=Mg, Ca, Sr, Ba) is 0–30, and wherein the total of $R_2O$ and MO is greater than 5, and the molar ratio between $Al_2O_3$ and $B_2O_3$ is 0.2–0.3 and the molar ratio between ($R_2O$+MO) and $B_2O_3$ is 0.1–0.4.

10 Claims, No Drawings

OPTICAL CROWN GLASS HAVING NEGATIVE ANOMALOUS PARTIAL DISPERSION AND HIGH UV TRANSMISSION

This invention relates to an optical crown glass having a negative anomalous partial dispersion $\Delta P_{g,F}$, preferably less than or equal to $-0.006$, a refractive index $n_d$ of greater than 1.52, an Abbe number $\nu_d$ of greater than 57 and at the same time very high UV transmission, in particular in the short-wave UV region between 300 and 250 nm. In particular, for a layer thickness of 10 mm, transmission values $T_i$ of greater than 80% can be achieved for the wavelength 250 nm, which will in the future be very important for microlithography.

BACKGROUND OF THE INVENTION

The crucial parameters for the use of an optical glass are the refractive index and the change in refractive index with wavelength, known as the dispersion.

The refractive index n in the central region of the visible spectrum is usually given as $n_d$, the refractive index at the wavelength 587.56 nm, for which purpose the spectral line used is the yellow helium line.

Increasingly, however, the requirement is, as in DIN 58925, for the specified principal refractive index to be the refractive index $n_e$ at 546.07 nm, which corresponds to the green mercury line.

The change in refractive index with wavelength is given by the Abbe number:

$$\nu_d = \frac{n_d - 1}{n_F - n_C} \text{ or in accordance with DIN 58 925}$$

$$\nu_e = \frac{n_e - 1}{n_F - n_C} \text{ where}$$

$n_F$ corresponds to the refractive index at the wavelength 486.13 nm (blue H line), $n_C$ corresponds to the refractive index at the wavelength 656.28 nm (red H line), $n_{F'}$ corresponds to the refractive index at the wavelength 479.99 nm (blue Cd line) and $n_{C'}$ corresponds to the refractive index at the wavelength 643.85 nm (red Cd line).

The difference $n_F - n_C$ or $n_{F'} - n_{C'}$ is known as the principal dispersion. Other differences represent partial dispersions. Relative partial dispersions $P_{g,F}$, are the ratio between a partial dispersion and the principal dispersion. The relative partial dispersion $P_{g,F}$, here based, for example, on the wavelengths g (435.83 nm, blue Hg line) and F' (479.99 nm, blue Cd line), is then given by:

$$P_{g,F} = \frac{n_g - n_F}{n_F - n_C}$$

Like the Abbe number, the relative partial dispersion is an important material constant for an optical glass.

The majority of glasses satisfy an approximately linear relationship between $P_{x,y}$ and $\nu$, given by $P_{x,y} = a_{x,y} + b_{x,y}\nu$ (standard straight line).

Glasses which do not satisfy this equation are known as glasses having anomalous partial dispersion. In this case, the equation must be expanded by an additional correction term $\Delta P_{x,y}$:

$$P_{x,y} = a_{x,y} + b_{x,y}\nu + \Delta P_{x,y}.$$

Depending on whether $\Delta P_{x,y}$ is greater than or less than 0, the glasses are known as glasses of positive or negative anomalous partial dispersion.

A suitable combination of optical glasses of different Abbe number allows imaging defects, chromatic aberration, for lens systems, for example for two colors, to be eliminated or at least improved. The residual chromatic aberration which exists for the uncorrected colors is known as the secondary spectrum. This effect is a particular disadvantage for high-performance optics, since it impairs the image sharpness and the resolution capacity of the optical system.

However, the use of glasses having anomalous partial dispersion in optical lens systems would allow the secondary spectrum to be diminished, giving corrected lens systems having excellent image sharpness and high resolution capacity.

Particularly desirable is correction in the blue region of the visible spectrum, which is characterized by the relative partial dispersion $\Delta P_{g,F}$ already mentioned above by way of example.

All currently known glasses featuring negative anomalous partial dispersion are borate glasses.

The choice of optical glasses having high negative anomalous partial dispersion with $\Delta P_{g,F}$ less than $-0.006$ is very restricted. For these glasses, a certain amassing in the dispersion region of the Abbe number around $\nu_d = 50$ is characteristic.

A broadening of the current range toward higher Abbe numbers is desired by the users, since this would enable further improved correction for optical lens systems.

The material having the greatest anomalous partial dispersion is an alum monocrystal, having a deviation of $-0.04$. In chemical terms, alum is potassium aluminum sulphate containing twelve molecules of water of crystallization: $KAl(SO_4)_2 \cdot 12 H_2O$.

However, the hygroscopic properties of this material mean that it has not achieved any practical significance in optics; alum dissolves in its own water of crystallization at 80° C. and, at low atmospheric humidity, it releases water of crystallization into the environment, even at room temperature. A further disadvantage is its low hardness.

However, adequate chemical resistance is an important criterion for any practical application of an optical glass.

For this reason, pure $B_2O_3$ glass, the glass with the absolutely highest anomalous partial dispersion, having an extrapolated $\Delta P_{g,F}$ value of about $-0.02$, cannot be employed either, since it is very difficult to prepare as a consequence of its hygroscopicity, due to its structure, and it effloresces after only a short time in air.

An optical glass which simultaneously has high negative anomalous partial dispersion and excellent UV transmission, in particular in the short-wave UV region below 300 nm, is not known from the prior art.

Thus, DE 39 17 614 C1 discloses an optical glass having negative anomalous partial dispersion $\Delta P_{g,F}$, a refractive index $n_d > 1.67$ and an Abbe number $\nu_d > 36$, having a composition (in % by weight) of $SiO_2$ 3–11, $GeO_2$ 0–3, $\Sigma$ $SiO_2$ +$GeO_2$ 4.5–11, $B_2O_3$ 29–35, $Al_2O_3$ 5–13, $ZrO_2$ 1–3, $TiO_2$ 0.2–3, $Ta_2O_5$ 0.2–1.5, PbO 30–45, $Li_2O$ 0–3, $Na_2O$ 0–3, $K_2O$ 0–3, $Rb_2O$ 0–3, $Cs_2O$ 0–3, $\Sigma$ alkali metal oxides 0–3, MgO 0–3.5, CaO 0–3.5, BaO 0–3.5, SrO 0–3.5, $\Sigma$ alkaline earth metal oxides 0–6 if $\Sigma$ $SiO_2+GeO_2 \geq 9$, $\Sigma$ alkaline earth metal oxides 0–3.5 if $\Sigma SiO_2+GeO_2 <9$, ZnO 0–14, $La_2O_3$ 0–3, $Nb_2O_5$ 0–7, $Sb_2O_3$ 0–1, $As_2O_3$ 0–0.3, $WO_3$ 0–1.5 and $F^-$ 0–1.

Favorable transmission properties should only be expected here as far as the blue spectral region at the furthest; no transmission data are given for the wavelength of the i line at 365.01 nm (ultra-violet Hg line). DE 39 17 614 C1 also differs through significant parts of the glass components, such as, for example, through a considerably lower $B_2O_3$ content.

East German Patent 1603 07 relates to an optical crown glass having a refractive index $n_e = 1.500$–$1.555$ and an Abbe number $\nu_e = 57$–$62$, negative anomalous partial dispersion $\Delta\nu_e < -7$, and increased crystallization and chemical resistance, and it is suitable for correction of the secondary spectrum in optical systems and contains at least the components $B_2O_3$–CaO–$Li_2O$ and/or $Na_2O$ and $Al_2O_3$, with the composition (in % by weight): $B_2O_3$ 73.0–87.0; $Li_2O$ and/or $Na_2O$ 3.0–5.0; $Al_2O_3$ 4.0–9.0; CaO 2.0–5.0; MgO 0–5.0; $La_2O_3$ 0–9.0; $ZrO_2$ 0–4.5.

The very high $B_2O_3$ content of 73–87% by weight and the low and thus not structure-optimal $Al_2O_3$ content of 4–9% by weight mean that the chemical resistance of these glasses, in particular for those having $\nu_e$ of greater than 60, is inadequate in practice. The possibility of adding $SiO_2$ as a stabilizer, which can have a favorable effect on the chemical resistance without the anomalous partial dispersion properties being lost, is not suggested in the East German Patent.

JP 60-46946 discloses UV-transparent glasses of the borosilicate type which are predominantly in the quaternary system CaO·$Al_2O_3$·$B_2O_3$·$SiO_2$. The glasses presented here have, apart from Example Nos. 10 and 11, excessively high $SiO_2$ contents for high negative anomalous partial dispersions to be achieved. Furthermore, Example Nos. 10 and 11 do not have the ratios necessary for high negative anomalous partial dispersion between the structure-determining components $Al_2O_3/B_2O_3$, $(R_2O+MO)/B_2O_3$.

The Japanese publication does not reveal any technical teaching according to which it would be possible to obtain glasses having high UV transmission and simultaneously high negative anomalous partial dispersion.

DE-B 1 303 171 relates to a glass batch for the production of optical glasses having anomalous partial dispersion and Abbe numbers $\nu_e$ of from 40 to 60 and refractive indexes $n_e$ of from 1.52 to 1.64, where the batch contains (in % by weight): $SiO_2$ 21.9–40; $B_2O_3$ 24.0–34.0; $Li_2O$ 2.0–10.0; $Al_2O_3$ 3.8–13.0; $Ta_2O_5$ 2.8–20.8; ZnO up to 5.1; $Na_2O$ up to 12.0; $ZrO_2$ up to 7.5; $WO_3$ up to 15.0.

DE-B 1 022 764 discloses an optical glass of anomalous partial dispersion which has been produced from boric acid and at least one alkali metal oxide and/or an oxide of a divalent element as the basic substance, the glass comprising from 45 to 80 mol per cent of boric acid, 5–18 mol per cent of alkali metal oxide and/or an oxide of a divalent element and 2–45 mol per cent of oxides of lanthanum, tantalum, niobium and/or lead phosphate.

DE-B 1 303 171 and DE-B 1 022 764 differ from the present invention through essential glass components and their ratios to one another. They likewise fail to achieve the desired magnitude of the negative anomalous partial dispersion.

DE 4 032 567 A1 discloses a glass having negative anomalous partial dispersion in the blue region, a refractive index $n_d$ of 1.69–1.83 and an Abbe number $\nu_d$ of 29–38.5, which contains, in % by weight based on oxide, 0–7.5 $SiO_2$ +$GeO_2$, 25–33 $B_2O_3$, 19–50 PbO, 0–2 HfO, 1–6 $ZrO_2$, 1–6 $ZrO_2$+$HfO_2$, 4–20 $Ta_2O_5$, 0–8.0 $Al_2O_3$, 0–4 $TiO_2$, 0–1 $WO_3$, 0–7 $Nb_2O_5$, 0–2 $GeO_2$, 0–4.5$Li_2O$, 0–4.5 $Na_2O$, 0–4.5 $K_2O$, 0–4.5 $\Sigma$ alkali metal oxides, 0–20 $\Sigma$ alkaline earth metal oxides +ZnO, 0–<9 $La_2O_3$, 0–5.5 $Y_2O_3$, 0–5.5 $Gd_2O_3$, 0–11 $\Sigma$ $La_2O_3$+$Y_2O_3$+$Gd_2O_3$, 0–10 MgO, 0–16 CaO, 0–16 BaO, 0–16 SrO, 0–16 BaO+SrO, 0–16 ZnO.

This glass is a flint glass having a very high PbO content.

SUMMARY OF THE INVENTION

An object of the invention is to provide optical crown glasses in which $n_d$ is >1.52, $\nu_d$ is >57, and which have high negative anomalous partial dispersion, at the same time very high UV transmission, and adequate crystallization stability and chemical resistance, and which can be produced reproducibly and inexpensively with good optical quality.

Upon further study of the specification and appended claims, further objects and advantages of this invention will become apparent to those skilled in the art.

To achieve these objects, there is provided a glass of the present invention containing, calculated on an oxide basis (in % by weight): 40–72 $B_2O_3$, 9–31 $Al_2O_3$, 0–15 $SiO_2$, 0.1–0.5 $H_2O$, 0–12 $Li_2O$, where the total $R_2O$ (R=Li, Na, K, Rb, Cs) is 0–20, and 0–20 MgO, 0–20 CaO, 0–20 SrO, 0–20 BaO, where the total MO (M=Mg, Ca, Sr, Ba) is 0–30, and where the total of $R_2O$ and MO is always greater than 5, and 0–10 ZnO, and where the total PbO, $WO_3$ and $TiO_2$ is 0–5 and the total of $ZrO_2$, $SnO_2$, $GeO_2$, $Ta_2O_5$, $Nb_2O_5$, $P_2O_5$, $Al_2O_3$, $Y_2O_3$, $Gd_2O_3$ and $Ga_2O_3$ is 0–10, and refining agents and reducing agents 0–3, with a molar ratio between $Al_2O_3$ and $B_2O_3$ 0.2–0.3 and a molar ratio between ($R_2O$+MO) and $B_2O_3$ of 0.1–0.4.

The glasses according to the invention simultaneously satisfy, for the first time, the demand for high negative anomalous partial dispersion $\Delta P_{g,F}$, and very high UV transmission. In particular at wavelength 250, the UV transmission $T_{i(250)}$ is preferably 40–83% for a sample 10 mm in thickness. For $T_{i(400)}$, the transmission is generally over 99%.

They can be produced inexpensively and reproducibly in good optical quality by means of the modern industrial glass melting processes which are conventional today.

It has been found to be essential to the invention that the structure-optimal molar ratio between $Al_2O_3$ and $B_2O_3$ is 0.2–0.3 and that between ($R_2O$+MO) and $B_2O_3$ is 0.1–0.4, where R=Li, Na, K, Rb or Cs and M=Mg, Ca, Sr or Ba, guarantee a glass structure containing a predominant proportion of boroxol ring-structure elements, the presence of which is on the one hand a prerequisite for very high UV transmission and on the other hand enables the incorporation of OH vibration dipoles, which is essential for achieving high negative anomalous partial dispersion.

It is believed that the glass properties according to the invention can only be achieved if the above-mentioned structure-determining glass composition ranges and molar ratios are maintained within the limits of the invention.

The essential components building up the glasses of the invention are $B_2O_3$, $Al_2O_3$ and in particular also $H_2O$, incorporated into the glass network as the structural group X—OH, where X=B, Al or Si; in a preferred embodiment, $R_2O$ is $Li_2O$, MO is CaO, and $SiO_2$ may be present. The use of the components $ZrO_2$, $SnO_2$, $GeO_2$, $Ta_2O_5$, $Nb_2O_5$, $P_2O_5$, $La_2O_3$, $Y_2O_3$, $Gd_2O_3$ and $Ga_2O_3$ is possible and necessary, for example, to establish relatively high refractive indices.

However, these components are only reserved for exceptional cases and special applications due to the associated raw material costs, which are in some cases very high.

The addition of glass constituents having high inherent absorption in the UV region, such as, for example, PbO, $WO_3$ and $TiO_2$, must, by contrast, be restricted to the lowest possible amounts in order to retain the good UV transmission properties.

In addition, it has been found that the incorporation of defined amounts of "water" into the structure of the glasses of the invention is of crucial importance for the high negative anomalous partial dispersion.

However, there is no evidence of a clear, quasilinear dependence of the negative anomalous partial dispersion on the absolute water content in the glass (working examples 15 and 17).

The structure-determining ratios found for the essential glass components of the invention allow incorporation of the OH groups into the glass structure, which is very favorable for high negative anomalous partial dispersion.

It is therefore necessary for at least 0.1–0.5% by weight of $H_2O$ to be incorporated into the glasses according to the invention in order to achieve the object of the invention, namely the achievement of high negative anomalous partial dispersion.

With respect to crystallization and chemical resistance of the glasses according to the invention, the following composition ranges (in % by weight) and conditions (molar) have been found to be particularly advantageous: $B_2O_3$ 50–65, $Al_2O_3$ 15–28, $SiO_2$ 1–10, $H_2O$ 0.12–0.2, $Li_2O$ 0–7, CaO 4–18, $\Sigma$ $Li_2O$+CaO 5–20, refining agents and reducing agents 0–3, where the molar ratio between $Al_2O_3$ and $B_2O_3$ is 0.2–0.3 and the molar ratio between ($LiO_2$+CaO) and $B_2O_3$ is 0.1–0.4.

Refining agents and reducing agents which can be used, in addition to the additives $As_2O_3$ and $Sb_2O_3$ which are usually used, are also fluorides, chlorides, tartrates, citrates or tin compounds.

The glasses are simple to produce and their melting points are relatively low.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application German No. P 42 18 377.4, filed Jun. 4, 1992, are hereby incorporated by reference.

The invention is described in greater detail with reference to an illustrative working example and examples of 18 glass compositions, and the properties thereof, shown in Tables I, II and III.

The compositions of the glasses are given in % by weight. In addition, $T_i$ (400) and $T_i$ (250) denote the pure transmission at 400 and 250 nm respectively for a sample thickness of 10 mm.

The $H_2O$ contents given were determined spectroscopically from the IR transmission curves of samples 0.2 mm in thickness compared with a calibration curve (virtually free of OH—) at the wave number of the highest intensity OH absorption band (about 3500 $cm^{-1}$/2800 nm):

$$E/d = e \cdot c = lg\ (T_o/T_{dope}) \cdot 1/d\ (cm^{-1})$$

$$C = E/d \cdot e\ (mol \cdot l^{-1})$$

$$C_{wt.\ \%} = C/_{mol/l} \cdot M_{H2O}\ 10 \cdot p,\ \text{where}$$

$$p = 2.2\ g/cm^{-3}\ \text{(density) and}$$

$$M_{H2O} = 18\ \text{(molecular weight)},$$

and where $T_O$=spectral transmission of the "undoped" sample,
$T_{dope}$ =spectral transmission of the "$H_2O$-doped" sample,
e=extinction coefficient; e=110 ($1 \cdot mol - 1 \cdot cm^{-1}$)
c=cell thickness ($cm^{-1}$) and
E/d=absorption.

The other abbreviations used in the table are:
$V_1$=molar ratio between the total of ($R_2O$+MO) and $B_2O_3$
$V_2$=molar ratio between $Al_2O_3$ and $B_2O_3$
ref.+red.=total of refining agents and reducing agents.

WORKING EXAMPLE

The calculated amounts of conventional raw materials for optical glasses, such as $H_2BO_3$, $Al(OH)_3$, $SiO_2$, oxides, carbonates, refining agents and reducing agents are weighed out and mixed well. The batch obtained in this way is melted at from about 1200° to 1300° C. under reducing conditions, refined and homogenized well. The melted glass treated in this way is poured at from 950° to 1050° C. into a prewarmed casting mold and subsequently cooled at temperatures of from 450° to 500° C.

Examples 13, 14 and 16 were carried out in accordance with the invention using the water-containing raw materials $H_3BO_3$ and $Al(OH)_3$. Examples 15 and (17) were carried out using the anhydrous raw materials $Al_2O_3$ and $B_2O_3$, and in addition the glass melt of Example 17 was further dewatered to a defined extent while being flushed with argon.

The $\Delta P_{g,F}$, values determined for Examples 15 and 17 are greater than −0.006, and the water contents determined from the IR transmission curves via the OH—absorption band are lower than 0.1% by weight.

These examples show that a minimum amount of $H_2O$ —bonded as X—OH—in the glass network is necessary in order to achieve high negative anomalous partial dispersion in the glasses according to the invention.

The content of $H_2O$ which produced the best results, on the one hand with respect to a high negative anomalous partial dispersion and on the other hand with respect to the chemical resistance of the glasses, was in all cases between 0.12 and 0.2% by weight.

If the starting raw materials employed are "anhydrous" components, the desired $H_2O$ or OH content must be established later with the aid of technologies known in the production of special glasses.

In practice, however, the content of $H_2O$ or $OH-X$ essential in accordance with the invention can be established easily and inexpensively by means of the raw materials boric acid ($H_3BO_3$) and aluminum hydroxide ($Al(OH)_3$).

described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed:

TABLE I

|  | 1 | 2 | 3 | 4 | 5 | 6 |
|---|---|---|---|---|---|---|
| $B_2O_3$ | 62.6 | 61.5 | 67.2 | 63.7 | 62.2 | 62.5 |
| $SiO_2$ | 1.6 | 1.6 |  |  |  |  |
| $Al_2O_3$ | 20.8 | 20.4 | 21.4 | 20.9 | 22.8 | 26.6 |
| $H_2O$ | 0.13 | 0.135 | 0.109 | 0.105 | 0.14 | 0.128 |
| $Li_2O$ | 6.1 | 4.0 | 6.3 | 6.1 | 6.7 | 6.8 |
| CaO |  | 3.7 |  |  | 8.3 | 4.1 |
| SrO |  |  |  |  |  |  |
| $La_2O_3$ | 8.9 | 8.7 |  |  |  |  |
| $Y_2O_3$ |  |  |  | 9.3 |  |  |
| $Gd_2O_3$ |  |  | 5.1 |  |  |  |
| ref. + red. | 0.1 | 0.1 | 0.1 | 0.1 | 0.3 | 0.1 |
| $n_e$ | 1.54724 | 1.55345 | 1.53635 | 1.55087 | 1.54630 | 1.52748 |
| $v_e$ | 60.3 | 60.3 | 60.3 | 60.4 | 60.9 | 61.1 |
| $P_{gF}$ | 0.4707 | 0.4713 | 0.4705 | 0.4748 | 0.4693 | 0.4732 |
| $\Delta P_{gF}$ | −0.01 | −0.0095 | −0.0083 | −0.0060 | −0.0107 | −0.0099 |
| $T_i(400)$ | 99.6 | 99.4 | 99.3 | 99.2 | 99.7 | 99.8 |
| $T_i(250)$ | 18.2 | 19.6 | 21.6 | 23.0 | 44.3 | 83.5 |
| $V_1$ | 0.227 | 0.227 | 0.217 | 0.224 | 0.416 | 0.334 |
| $V_2$ | 0.227 | 0.227 | 0.217 | 0.224 | 0.250 | 0.290 |

TABLE II

|  | 7 | 8 | 9 | 10 | 11 | 12 |
|---|---|---|---|---|---|---|
| $B_2O_3$ | 61.4 | 63.8 | 61.8 | 60.7 | 64.9 | 68.7 |
| $SiO_2$ |  |  | 8.9 | 8.7 | 1.6 |  |
| $Al_2O_3$ | 26.1 | 27.1 | 22.6 | 22.2 | 19.0 | 25.0 |
| $H_2O$ | 0.142 | 0.136 | 0.122 | 0.145 | 0.127 | 0.140 |
| $Li_2O$ | 4.5 | 9.1 | 6.7 | 4.3 | 1.0 | 6.3 |
| CaO | 8.0 |  |  | 4.1 | 7.5 |  |
| SrO |  |  |  |  | 6.1 |  |
| $La_2O_3$ |  |  |  |  |  |  |
| $Y_2O_3$ |  |  |  |  |  |  |
| $Gd_2O_3$ |  |  |  |  |  |  |
| ref. + red. | 0.1 | 0.1 | 0.1 | 0.1 | 0.1 | 0.3 |
| $n_e$ | 1.53991 | 1.52986 | 1.52000 | 1.52453 | 1.53885 | 1.52482 |
| $v_e$ | 61.0 | 60.8 | 60.9 | 61.0 | 61.0 | 60.8 |
| $P_{gF}$ | 0.4715 | 0.4664 | 0.4711 | 0.4695 | 0.4700 | 0.4660 |
| $\Delta P_{gF}$ | −0.0106 | −0.0138 | −0.0098 | −0.0110 | −0.0096 | −0.0130 |
| $T_i(400)$ | 99.8 | 99.8 | 99.5 | 99.5 | 99.1 | 99.8 |
| $T_i(250)$ | 80.1 | 81.0 | 78.6 | 75.8 | 74.6 | 82.5 |
| $V_1$ | 0.332 | 0.332 | 0.250 | 0.250 | 0.242 | 0.213 |
| $V_2$ | 0.290 | 0.290 | 0.250 | 0.250 | 0.200 | 0.248 |

TABLE III

|  | 13 | 14 | 15 | 16 | 17 | 18 |
|---|---|---|---|---|---|---|
| $B_2O_3$ | 71.1 | 71.1 | 71.1 | 71.1 | 71.1 | 52.2 |
| $SiO_2$ |  |  |  |  |  | 8.5 |
| $Al_2O_3$ | 22.4 | 22.4 | 22.4 | 22.4 | 22.4 | 22.6 |
| $H_2O$ | 0.119 | 0.125 | 0.08 | 0.14 | 0.014 | 0.135 |
| $Li_2O$ | 6.5 | 6.5 | 6.5 | 6.5 | 6.5 |  |
| CaO |  |  |  |  |  | 16.7 |
| SrO |  |  |  |  |  |  |
| $La_2O_3$ |  |  |  |  |  |  |
| $Y_2O_3$ |  |  |  |  |  |  |
| $Gd_2O_3$ |  |  |  |  |  |  |
| ref. + red. | 0.1 | 0.1 | 0.1 | 0.1 | 0.1 | 0.1 |
| $n_e$ | 1.52763 | 1.52492 | 1.52068 | 1.52700 | 1.52186 | 1.54812 |
| $v_e$ | 61.1 | 60.9 | 60.9 | 60.7 | 60.6 | 61.0 |
| $P_{gF}$ | 0.4670 | 0.4715 | 0.4760 | 0.4680 | 0.4750 | 0.4710 |
| $\Delta P_{gF}$ | −0.0120 | −0.0084 | −0.0040 | −0.0126 | −0.0054 | −0.0097 |
| $T_i(400)$ | 99.5 | 99.7 | 99.7 | 99.5 | 99.3 | 99.5 |
| $T_i(250)$ | 77.5 | 81.1 | 76.2 | 60.9 | 76.2 | 70.2 |
| $V_1$ | 0.21 | 0.21 | 0.210 | 0.210 | 0.210 | 0.400 |
| $V_2$ | 0.21 | 0.21 | 0.210 | 0.210 | 0.210 | 0.295 |

The preceding examples can be repeated with similar success by substituting the generically or specifically 1. An optical crown glass having a negative anomalous partial dispersion $\Delta P_{g,F}$, a refractive index $n_d$ of not less than 1.52, an Abbe number $\nu_d$ of not less than 57, a high UV transmission and a composition (in % by weight):

| | |
|---|---|
| 40–72 | $B_2O_3$ |
| 9–31 | $Al_2O_3$ |
| 0–15 | $SiO_2$ |
| 0.1–0.5 | $H_2O$ |
| 0–12 | $Li_2O$ |
| 0–20 | total $R_2O$ wherein R = Li, Na, K, Rb, Cs |
| 0–20 | MgO |
| 0–20 | CaO |
| 0–20 | SrO |
| 0–20 | BaO |
| 0–30 | total MO wherein M = Mg, Ca, Sr, Ba, and total ($R_2O$ + MO) > 5 |
| ZnO | 0–10 |
| total PbO, $WO_3$, $TiO_2$ | 0–5 |
| total $ZrO_2$, $SnO_2$, $GeO_2$, $Ta_2O_5$, $Nb_2O_5$, $P_2O_5$, $La_2O_3$, $Y_2O_3$, $Gd_2O_3$, $Ga_2O_3$ | 0–10 |
| total of refining agents and reducing agents | 0–3, | wherein the molar ratio between $Al_2O_3$ and $B_2O_3$ is between 0.2 and 0.3, and the molar ratio between ($R_2O$+MO) and $B_2O_3$ is between 0.1 and 0.4.

2. An optical crown glass according to claim 1, having a composition (in % by weight):

| | |
|---|---|
| 50–65 | $B_2O_3$ |
| 15–28 | $Al_2O_3$ |
| 1–10 | $SiO_2$ |
| 0.12–0.2 | $H_2O$ |
| 0–7 | $Li_2O$ |
| 4–18 | CaO |
| total $Li_2O$ + CaO | 5–20 |
| refining agents and reducing agents | 0–3, | wherein the molar ratio between $Al_2O_3$ and $B_2O_3$ is between 0.2 and 0.3, and the molar ratio between ($Li_2O$+CaO) and $B_2O_3$ is between 0.1 and 0.4.

3. An optical crown glass according to claim 1 containing in % by weight 0.12–0.2 $H_2O$.

4. An optical glass according to claim 1 having an anomalous partial dispersion equal to or less than −0.006.

5. An optical glass according to claim 2 having an anomalous partial dispersion equal to or less than −0,006.

6. An optical glass according to claim 3 having an anomalous partial dispersion equal to or less than −0.006.

7. An optical crown glass having a negative anomalous partial dispersion $\Delta P_{g,F}$, a refractive index $N_d$ of not less than 1.52, an Abbe number $\nu_d$ of not less than 57, a high UV transmission and a lead-free composition (in % by weight):

| | |
|---|---|
| 40–72 | $B_2O_3$ |
| 9–31 | $Al_2O_3$ |
| 0–15 | $SiO_2$ |
| 0.1–0.5 | $H_2O$ |
| 0–12 | $Li_2O$ |
| 0–20 | total $R_2O$ wherein R = Li, Na, K, Rb, Cs |
| 0–20 | MgO |
| 0–20 | CaO |
| 0–20 | SrO |
| 0–20 | BaO |
| 0–30 | total MO wherein M = Mg, Ca, Sr, Ba, and total ($R_2O$ + MO) > 5 |
| ZnO | 0–10 |
| total $WO_3$, $TiO_2$ | 0–5 |
| total $ZrO_2$, $SnO_2$, $GeO_2$, $Ta_2O_5$, $Nb_2O_5$, $P_2O_5$, $La_2O_3$, $Y_2O_3$, $Gd_2O_3$, $Ga_2O_3$ | 0–10 |
| total of refining agents and reducing agents | 0–3, | wherein the molar ratio between $Al_2O_3$ and $B_2O_3$ is between 0.2 and 0.3, and the molar ratio between ($R_2O$+MO) and $B_2O_3$ is between 0.1 and 0.4.

8. An optical crown glass according to claim 7 containing in % by weight 0.12–0.2 $H_2O$.

9. An optical glass according to claim 7 having an anomalous partial dispersion equal to or less than −0.006.

10. An optical glass according to claim 8 having an anomalous partial dispersion equal to or less than −0.006.

* * * * *